Dec. 30, 1941.  D. E. MARSHALL  2,268,220
RECEPTACLE DUMPING MECHANISM
Filed Dec. 23, 1938  3 Sheets-Sheet 1

Inventor
DONALD E. MARSHALL,
BY
Toulmin & Toulmin
Attorneys

Dec. 30, 1941.  D. E. MARSHALL  2,268,220
RECEPTACLE DUMPING MECHANISM
Filed Dec. 23, 1938  3 Sheets-Sheet 2

INVENTOR
DONALD E. MARSHALL
BY Toulmin & Toulmin
ATTORNEYS

Dec. 30, 1941.    D. E. MARSHALL    2,268,220
RECEPTACLE DUMPING MECHANISM
Filed Dec. 23, 1938    3 Sheets-Sheet 3
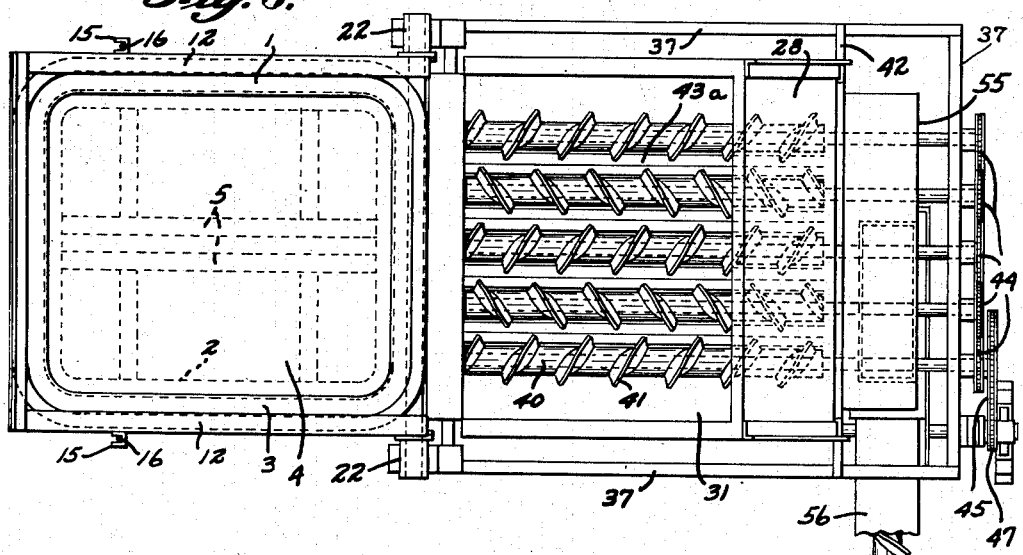
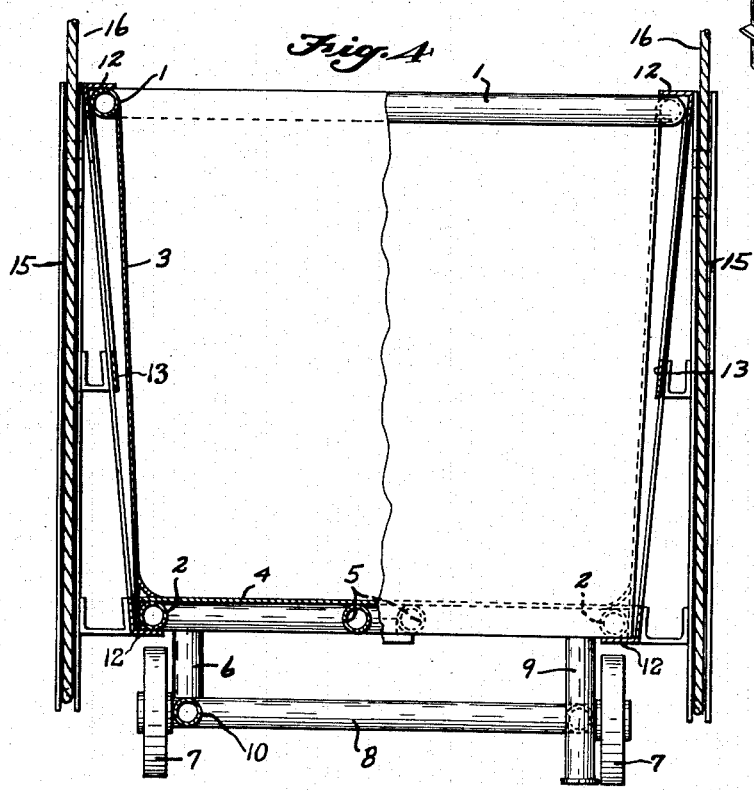
INVENTOR
DONALD E. MARSHALL
BY Poulmin & Poulmin
ATTORNEYS Patented Dec. 30, 1941

2,268,220

UNITED STATES PATENT OFFICE 2,268,220

RECEPTACLE DUMPING MECHANISM

Donald E. Marshall, Battle Creek, Mich., assignor to Kellogg Company, Battle Creek, Mich., a corporation of Delaware Application December 23, 1938, Serial No. 247,323

3 Claims. (Cl. 214—1.1)

The present invention relates to cereal conveyors and more particularly to apparatus for feeding corn from a portable tank or other storage chamber simultaneously to a plurality of processing machines.

Objects of the invention are to provide an improved hoisting mechanism or tipple for receiving and dumping a receptacle or a tank containing a batch of cereal onto a conveyor; to provide an arrangement for locking the receptacle in the tipple together with means for preventing the hoisting of the tipple except when the receptacle is locked in place; to provide electrical circuits and devices for indicating when the tipple has reached its dumping and initial positions, and to prevent further movement of the tipple until it has completed its prior movement; to utilize a cable and drum mechanism for the hoisting operation together with a device for indicating the condition of slackness in the cable and a control circuit which prevents operation of the tipple until the cable has been rendered taut.

Further objects and features will be apparent as the specification is perused in connection with the accompanying drawings, in which—

Figure 2 is an enlarged end view of the tipple; while

Figure 3 is a top plan view of the same machine.

Figure 4 is an enlarged view, but looking at the end of the tipple opposite from Figure 2, but not showing the hood or upper portion of the tipple.

Figure 5 shows a circuit for operating the tipple, including the dumping and conveying mechanism.

Figure 6 is a fragmentary view showing a bar for locking a cereal-containing receptacle in the tipple and also an electrical means for determining when the bar is in place and the receptacle is locked in the tipple, ready to be hoisted.

A clearer understanding of a tipple which is about to be described will be had if the purpose of such a device and its relation to other machines or devices in the process line of a cereal factory is explained. A tipple is simply an arrangement of parts including a conveyor mechanism, by which a batch of cereal contained in a portable tank is hoisted from the floor and the contents introduced to the conveyors in such a manner as to feed the cereal evenly and without lumps to the nearest processing machine in the line.

The tipple is illustrated in Figures 1, 2, 3, 4 and 6, and these figures, in addition, show a food or cereal tank in place ready to be hoisted by the tipple. The tank is best illustrated in Figures 3 and 4 and consists essentially of an upper and lower frame, designated 1, 2 respectively, made of metal tubing welded together and bent into a rectangular shape and supporting between them the four sides 3 of the tank. These sides may comprise sheet metal and the upper frame member is of larger size than the lower frame member so that the sides taper slightly toward the bottom as is indicated in Figure 4. The frame member 2 carries a bottom plate 4 of metal which is secured to the frame in any suitable manner.

Figure 1:
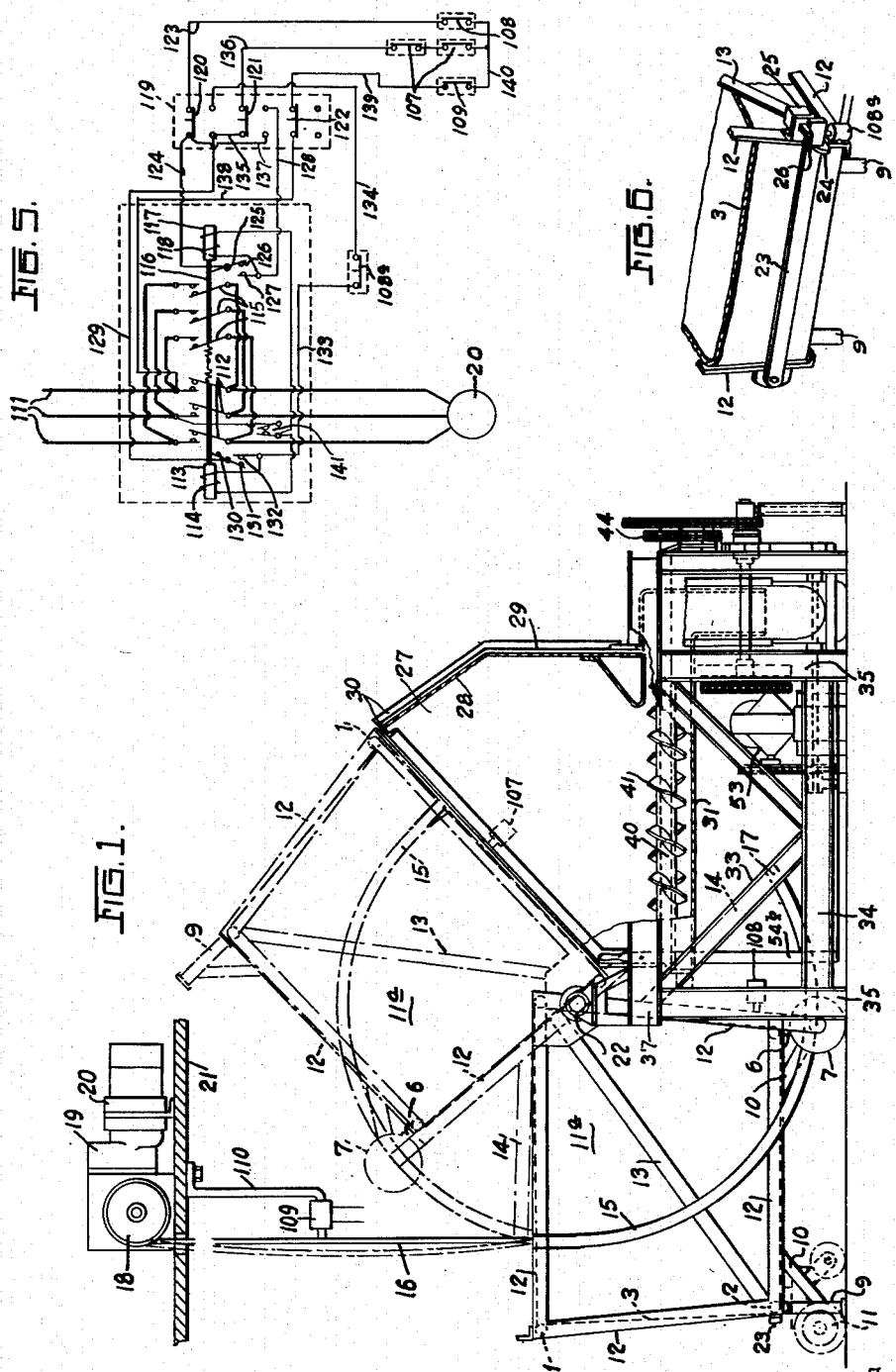
Figure 1 is a side elevational view, partly in section, of a combined dumping arrangement and conveyor which will hereinafter be designated a "tipple" for feeding cereal to a battery of processing machines.
Figure 2:
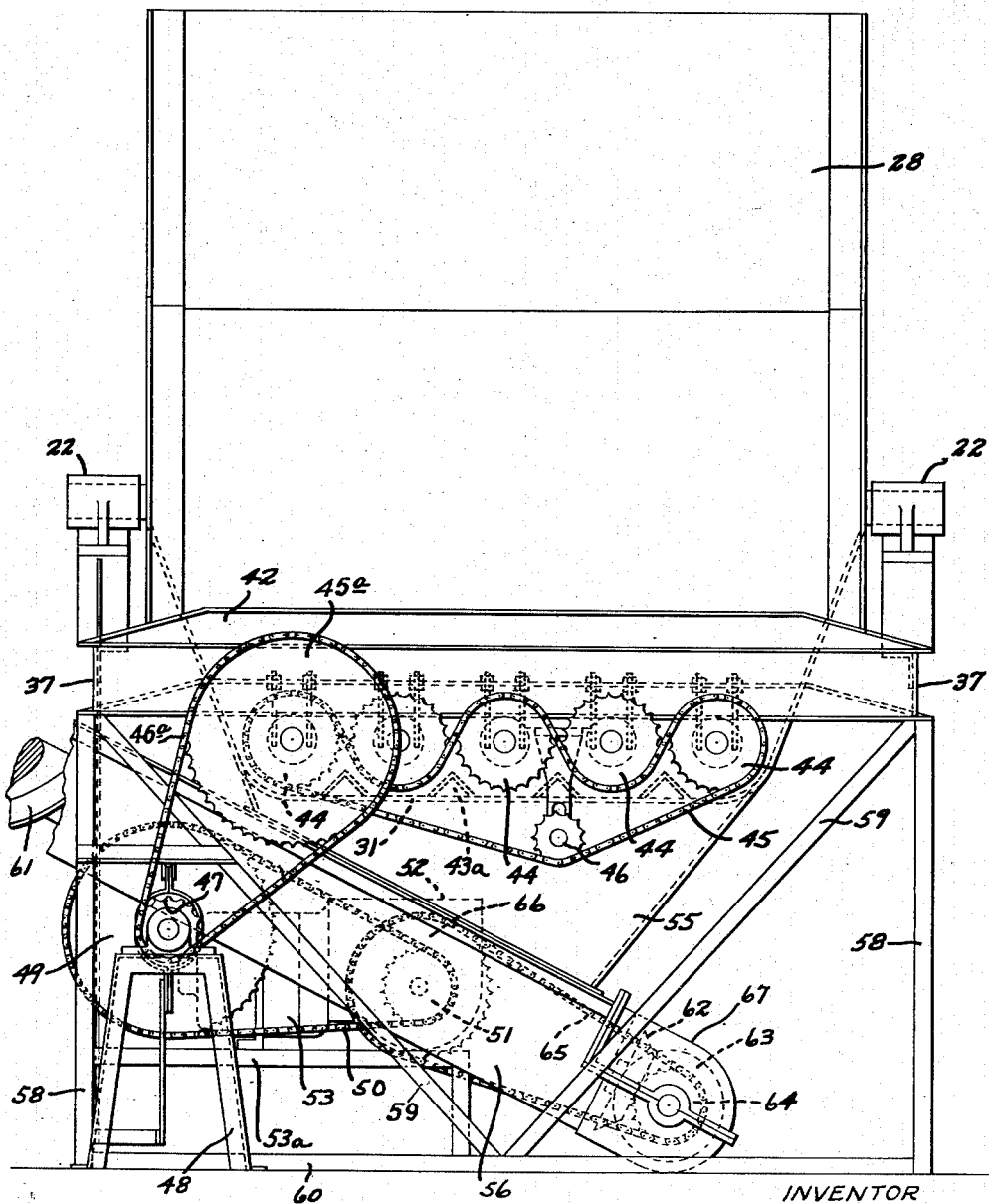

If desired, a pair of transversely extending tubular members 5 may be secured to the bottom plate for additional support. The use of the tubular members is advantageous in that it eliminates sharp metal edges and reduces the possibility of introducing metal particles into the food contents of the tank. The front or right-hand end of the tank, as seen in Figure 1, carries a pair of extensions 6 which serve as a bearing for a pair of wheels 7, the wheels being connected through an axle 8. The other or left-hand end of the tank carries a pair of extensions 9, at each side of the tank, which serve as a stand for supporting the tank from the floor. Brace members 10 (Figures 1 and 4) may be employed, if desired, to give rigidity to the extensions 6, 9.

Thus, in order to move the tank, it is simply necessary to pick up that end of the tank, to which the stanchions or extensions are secured, and wheel the forward end on the wheels 7. A handle (not shown) may be provided at the rear end of the tank for this purpose. If desired, and particularly when the tank is loaded with heavy foodstuff, such as corn, the end of the tank opposite from the wheels 7 may be supported on a wheelable jack or dolly 11 of well-known construction, as indicated.

As stated hereinbefore, a tipple is employed for the purpose of hoisting a food tank, such as described, which may be filled with cereal from the floor onto a system of conveyors in order to transport the cereal along the line to the next processing machines. For this hoisting operation, the tank is wheeled into a frame shown more clearly in Figures 1 and 3, which is adapted to be moved around the arc of a circle to a position such as to cause the feed tank to dump its contents. This frame may consist of a skeleton box made up of angle irons welded or riveted together and of a size sufficient to receive the tank.

Figure 1 shows one complete side of the frame 11a composed of the angle iron members 12 together with a diagonal strengthening member 13. It will be understood that there are four similar sides except that the left-hand side member as seen in Figure 1 is not provided with the diagonal member 13. These side members are all secured together and the internal dimensions are such that the food tank can be wheeled into position within the frame, moving in a direction as indicated by the arrow in Figure 1 and securely locked in place, as will be explained below. The front or righthand end of the frame, as seen in Figure 1, carries a U-shaped bar 14 which extends outwardly and downwardly from the frame to which it is secured. This member is indicated by dotted lines in the figure.

The opposite sides of the frame 11a carry a U-shaped metal member 15 of arcuate configuration, the upper end of which is secured to one of the top frame members 12, and the lower end is secured to the diagonal bar 14. The member 15 can also be mechanically joined, if desired, to the diagonal 13 for greater rigidity of structure. The flanges of the oppositely positioned U-shaped members 15 extend to the rear or to the left, as seen in Figure 3. These arcuate members serve as a runner guide for a cable 16 which is attached to the junction between members 14, 15, as indicated at 17, on each side of the frame. Thus the cable lies within the groove formed by the flanges or legs of the arcuate members 15.

For pulling on the pair of cables 16, drums 18 are provided, which are connected through a gear box 19 to an electric motor 20 supported above the floor 21. The frame 11a is adapted to be rotated on bearings 22 which are carried by the front or righthand vertical frame members, the rotational force being exerted through the cables 16 to hoist the frame and the contained food tank from the floor to a dumping position, as indicated by the dot-dash lines in Figure 1.

In order to prevent any possibility of the food tank moving out of position from the frame during this rotating movement, I provide a tie or lock bar 23 (seen more clearly in Figure 6) hinged or pivoted at one end to the frame and the other end of which is adapted to engage a retaining hook 24 which is secured to the other side of the frame. A spring latch at 25 having a beveled contact member 26 may also be employed to prevent an accidental vertical movement of the lock bar after the latter has been placed in position. Suitable means (not shown) may be provided to withdraw the latch at 25, so as to permit the bar to be moved from position and the food tank wheeled from the frame 12.

As shown in Figure 1, the open top of the tank, when in its hoisted position, registers with the opening in a hopper 27 which comprises simply a rectangular casing made with sheet metal sides, the front one of which carries a bevel, as indicated at 28, and terminates in a vertical portion 29. The sides and also the top edge of the hopper may be strengthened, if desired, by angle iron members 30. The bottom of the hopper is preferably flat, as indicated at 31.

The hopper is secured in any suitable manner to a frame constituted of three U-shaped members 37 which take on a rectangular configuration, as seen more clearly in Figure 3. The two opposite pairs of members provide a support for the bearings 22. The members 37 are, in turn, supported by four U-shaped uprights 35 which are secured at the bottom to the horizontal frame members 34. A pair of diagonally disposed U-shaped members 33 may extend from each side of the upper frame member 37 to the lower frame 34 for additional rigidity.

In accordance with one of the stated objects of the invention, it is desired to move material dumped into the hopper 27 from the lefthand side of the hopper to the righthand side, as seen in Figure 1, and simultaneously to break up any lumps which may be present. In the case of corn, particularly after being cooked in a flavoring mixture which includes sugar and other sticky substances, there is a strong tendency for the grains to collect and stick together. For the conveying and de-lumping purposes, I provide a number of parallelly arranged screw conveyors 40 adjacently positioned in a horizontal plane. These conveyors consist of a shaft having on its periphery a helix or continuous screw 41 of large pitch, which convey the cereal or other foodstuff in a continuous manner in the direction to which the screws are pitched and depending upon their direction of rotation. For practical reasons, the alternate screw conveyors are rotated in opposite directions and, therefore, pitched oppositely.

A motor 53 provides rotative power for the sprockets 44 which cause the screws 41 on the shaft 40 continually to move the cereal or other material contained in the hopper toward the right, as viewed in Figure 1. Any lumps or other non-uniformity in the distribution of the cereal are immediately eliminated by the action of the screws 41 which serve to churn the cereal.

There is provided an electrical control system for the hoisting portion of the tipple. For practical reasons, it has been found desirable to start the motor 20 on its hoisting operation by a push button and to cause the motor to reverse its direction of rotation for returning the rotating frame 11a to its initial position also by means of a push button. It is also necessary to provide some means which will prevent this reversal of the motor direction until the frame and contained receptacle have actually reached the dumping position, and likewise to prevent the hoisting operation until the frame and receptacle have actually reached their initial position. A circuit for accomplishing this result is shown in Figure 5, which also includes an arrangement by which the motor 20 is prevented from hoisting the tipple unless the bar 23 is in place to lock the receptacle within the frame. For still further protection, there is included in this circuit a device for determining when the hoisting cable is slack. It will be understood that the food tank filled with cereal and the frame which surrounds it constitute a heavy load for the hoisting cables 16; and, if there is any slackness in one or both cables, a considerable snap is apt to be introduced when the drum 18 is rotated, which might cause breakage of the cable.

For operating the circuit about to be described, a number of switches are placed in advantageous positions on the tipple. Referring now to Figure 1, there is a pair of plunger type switches 107 positioned at opposite sides of the hopper 27 and suitably mounted, for example, on the angle irons 30. The plungers are so positioned as to contact with the surface of two oppositely positioned uppermost frame members 12 so that, as the food tank is moved to a dumping position, the plungers of the switches are depressed. These switches contain a suitably mounted terminal and lever system (not shown), which causes an opening of the circuit when the plunger is depressed. One or more similar switches 108 may be suitably mounted, for example, on the upright 35 to have its plunger depressed by the rear or righthand frame member 12 when the frame and contained food tank have been returned to their initial postion.

A switch 108a is also suitably mounted directly under the lock bar 23 so that the latter will contact with the plunger of the switch when it is in locking position. This switch is different from switches 107 and 108 only in that the contacts close when the lock bar is in position. Still another switch 109, similar to switch 108, is suitably mounted as, for example, on a hanger 110 from the floor 21 (Figure 1) and having its plunger in contact with the cable 16. If the cable becomes slack, it will tend to bulge (as indicated by the dotted line) or in some other manner remove the pressure against the plunger of the switch, thus opening the contact.

The hoisting motor 20 is energized preferably from a three-phase system, as indicated by the wires 111 and through an automatically controlled switch 112. The blades of this switch are carried on the armature 113 of an electromagnet 114. The connections to the motor are reversed by means of an automatically controlled switch 115, the blades of which are carried on an armature 116 of an electromagnet 117. All of the switch mechanism is preferably mounted on a single panel 118. To the right of this panel, there is shown another panel 119, on which are mounted switches 120, 121 and 122 of the push button spring-biased type. These switches are so constructed that they can complete a circuit through a pair of terminals when in their upper or unpressed condition and can complete a different circuit across another pair of terminals when they are pressed against the biasing spring.

As will be seen from the circuit, the righthand upper terminal of the switch 120 is connected through a conductor 123 to the upper terminal of the switch 108. The lefthand upper terminal of the switch 120 is connected through a conductor 124 to a pivoted lever 125, one end of which carries a contact 126 and the other end is secured to the armature 116. Directly opposite from the contact 126, there is a contact 127 which is connected through a conductor 128 to the lower righthand terminal of the switch 121. The lower lefthand terminal of the switch 120 is connected through a conductor 129 to a pivoted lever 130 which is secured at one end to the armature 113 and at the other end carries a contact 131. This contact is positioned opposite to a contact 132 which is connected through a conductor 133 and through switch 108a and conductor 134 to the lower righthand terminal of the switch 120. The upper lefthand terminal of the switch 121 is connected by a conductor 135 to the lower lefthand terminal of the switch 120. The upper righthand terminal of the switch 121 is connected by a conductor 136 to both of the switches 107. The lower lefthand terminal of the switch 121 is connected by conductor 137 to the upper lefthand terminal of the switch 120. The upper lefthand terminal of the switch 122 is connected through a conductor 138 to the righthand line of the three-phase system. The upper righthand terminal of the switch 122 is connected through a conductor 139 to the switch 109. The lower terminals of the switches 108, 109 and the lower terminal of one of the switches 107 are connected together by conductor 140.

Assume that the frame 12 and the contained tank are in their floor position and it is desired to lift the tank to the dumping position, the switch 120 is pressed downward to make contact with its lower pair of terminals. A circuit is then established from the middle line of the three-phase system through an automatic trip switch 141, through the electromagnet coil 114, conductor 133, through switch 108a (assuming the lock bar is in place), through conductor 134, through switch 120 (in its lower position), conductor 135, switch 121 (in its upper position), conductor 136, through both switches 107 and switch 109, switch 122 (in its upper position) and conductor 138 to the righthand line of the three-phase system. The electromagnet becomes energized and pulls its armature to the left and closes the circuit through the switch 112 to the motor 20.

It is apparent that the circuit through the electromagnet would not have been established if either the lock bar 23 were not in place to close the switch 108a, or the switches 107 were not closed. Had the frame 12 and the contained food tank been in the elevated position at the time switch 120 was closed, the switches 107 would have been opened so that no circuit could be established. A lock circuit is provided for the electromagnet so that the switch 120 can be released. This lock circuit may be traced from the middle line of the three-phase system through the coil 114, switch contacts 130, 131, which are now closed, through conductors 129, 135, through switch 121, conductor 136, both switches 107, switches 109, 122 and conductor 138, back to the righthand side of the line. It will be noted that both the starting circuit and the locking circuit include the switch 109 so that if the cable 16 does not contact with this switch due to a slack condition, either of these circuits are immediately opened. The motor, therefore, remains energized, even though the switch 120 is returned to its initial position and consequently the cable pair 16 rotates the frame and its contained food tank to the dumping position shown in Figure 2. When they reach this position, the plungers of the switches 107 are forced downwardly, which thereupon opens the circuit through the conductor 136.

When it is desired to reverse the rotation of the drum 18 to lower the frame and the food tank to the floor, the switch 121 is pressed downwardly to contact with its two lower terminals. A circuit is then established from the righthand side of the three-phase system through conductor 138, switches 122, 109, conductor 140, switch 108, conductor 123, switch 120, conductor 137, switch 121 (in its lower position), conductor 128, coil 117, through the trip switch 141 to the middle line of the three-phase system. This circuit causes the electromagnet 117 to energize and to close the switch 115 which, as will be noted, serves to reverse two of the phases of the three-phase system to the motor. A holding circuit is also established at the contacts 126, 127 through the conductor 124, switch 120, conductor 123, switch 108, conductor 140, switches 109, 122, conductor 138 to the righthand side of the line. Starting at the contact 127, the rest of the holding circuit can be traced through the coil 117, the trip switch 141 to the middle line of the three-phase system. Consequently, the switch 121 can be released and the motor will remain energized through the holding circuit. It will be noted that the switch 108 is included in this holding circuit so that, if it were opened as might be the case when the frame and the food tank were in their lower position, pressing of the switch 121 would not serve to cause a reversal of the connections to the motor.

It is, therefore, apparent that I have provided an electrical control system which prevents rotation of the motor in a hoisting direction in case the frame and contained food tank are in their elevated or dumping position and the control system likewise prevents a reversal of the motor in case the frame and food tank are in their lower or loading position. The switch 122 is a hand-operated emergency switch and is contained serially in the circuits which control the hoisting and lowering operations of the motor. Thus, these operations can be stopped at any time by breaking the circuit at the switch 122.

It will be understood that I desire to comprehend within my invention such modifications as come within the scope of the claims and the invention.

Having thus fully described my invention, what I claim as new and desire to secure by Letters Patent is:

1. A tipple for hoisting a cereal-containing receptacle from an initial to a dumping position, said tipple comprising a rotatable frame which receives and substantially surrounds the receptacle, said frame being pivoted near its upper edge for rotation purposes, means for locking the receptacle in said frame, means for rotating the frame about its pivots until the receptacle is brought into dumping position, and means responsive to an unlocked condition of said locking means for preventing the actuation of said rotating means.

2. A tipple for hoisting a cereal-containing receptacle from an initial to a dumping position, said tipple comprising a frame adapted to receive the receptacle, and means for locking the receptacle in said frame, means including a cable and drum for hoisting the frame until the receptacle is brought into dumping position, and means responsive to an unlocked condition of said locking means and to a slack condition in said cable for preventing the actuation of said hoisting means.

3. A tipple for hoisting a cereal-containing receptacle from an initial to a dumping position, said tipple comprising a frame adapted to receive the receptacle, means for locking the receptacle in the frame, means including a cable and drum for moving the frame until the receptacle is brought into a dumping position and then returned, and means for preventing the operation of said drum in either direction when the receptacle is unlocked in the frame and when there is a slack condition of the cable.

DONALD E. MARSHALL.